United States Patent Office 2,712,277
Patented July 5, 1955

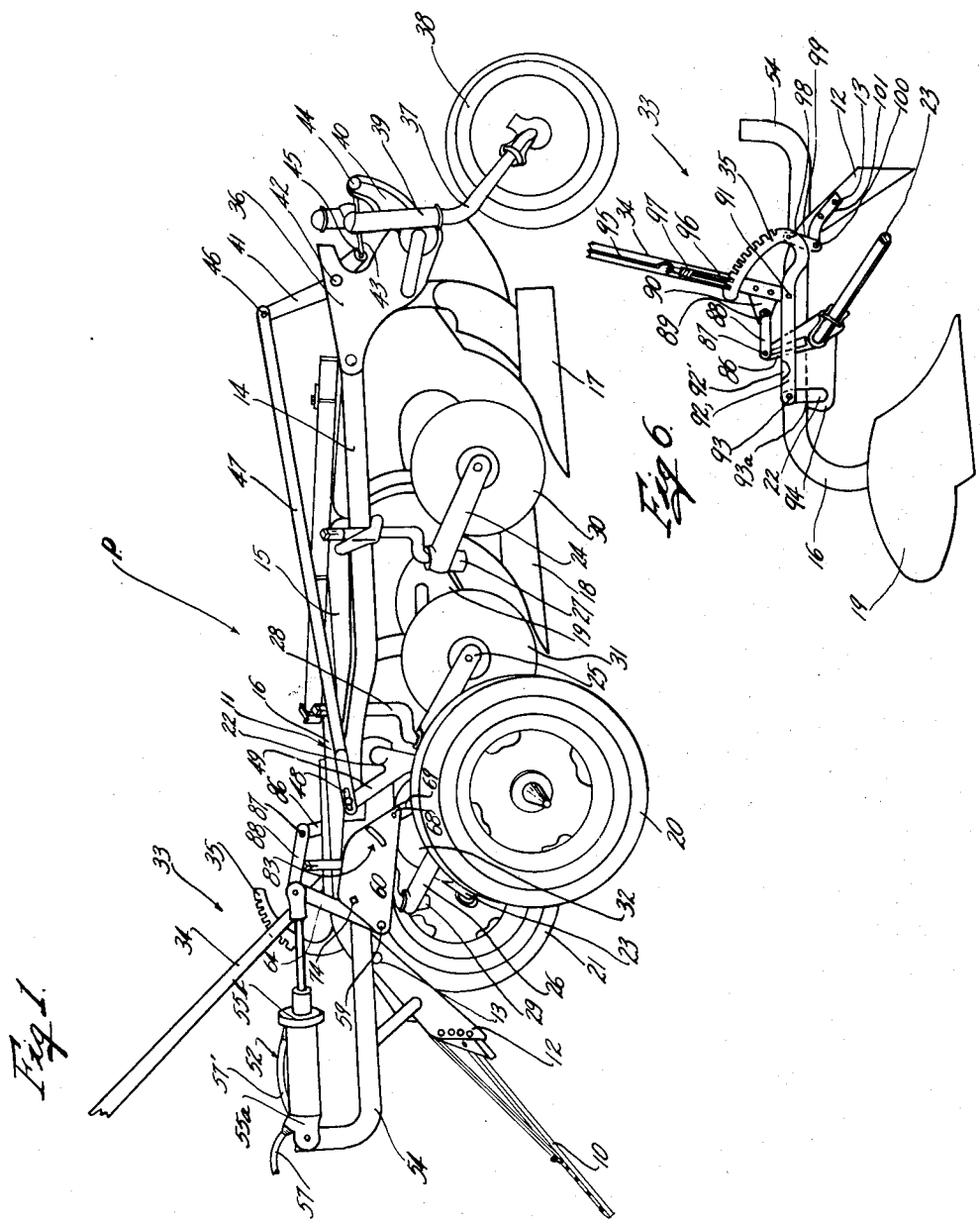

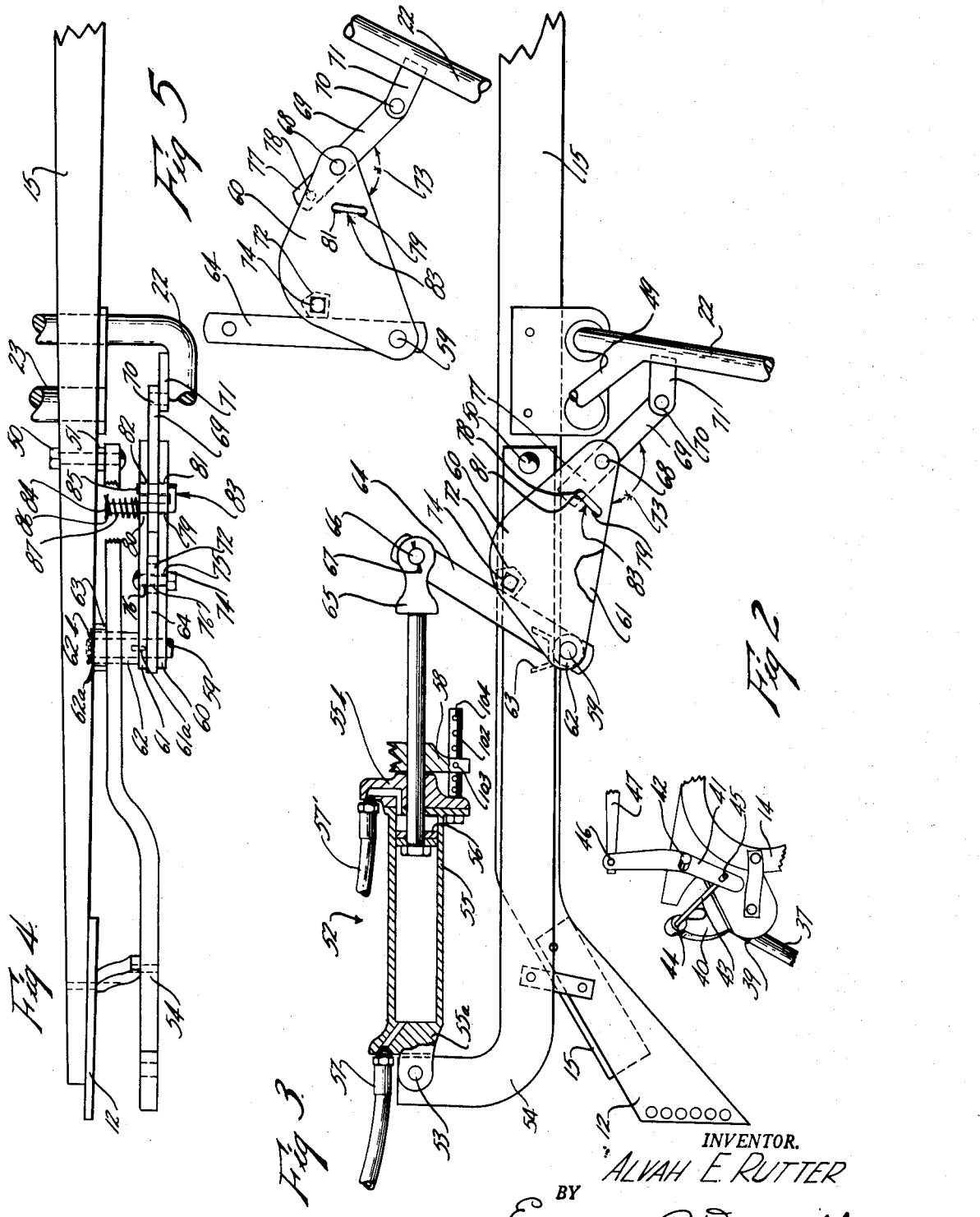

2,712,277

HYDRAULICALLY ACTUATED LIFTING MECHANISM FOR FARM IMPLEMENTS

Alvah E. Rutter, Rockford, Ill., assignor to J. I. Case Company, Racine, Wis., a corporation of Wisconsin Application September 29, 1949, Serial No. 118,578

16 Claims. (Cl. 97—46.31)

The present invention relates to hydraulically actuated lifting mechanism for trail type farm implements designed to be drawn behind a tractor and which have earth working implements to be lifted or adjusted relative to the ground.

An object of the present invention is to improve the hydraulically actuated lifting mechanism of farm implements.

Another object of this invention is to improve the lifting mechanism of a tractor drawn wheel-plow.

A further object is to provide means whereby the implement may be locked in a raised position and the hydraulic actuating unit removed from the implement for use on other implements.

A still further object is to provide means whereby the hydraulic ram unit can be mounted on the implement when the implement is locked in a raised position regardless of whether the hydraulic ram unit is fully extended, partially extended or fully retracted.

Still a further object of this invention is to provide a linkage system in which the plow bottom is allowed to independently penetrate the ground by means of the suction of the share and gravity rather than being forced into the soil by the hydraulic ram unit.

Another object of this invention is to provide means whereby the wear which occurs in the linkage system can be compensated for and thereby maximum efficiency maintained as the machine gets older.

Further objects and advantages will become apparent from the following specification and drawings of which:

Fig. 1 is a left side elevational view of the device embodying my invention.

Fig. 2 is a fragmentary right hand side view of part of Fig. 1 showing the caster wheel control mechanism of the device carrying my invention.

Fig. 3 is an enlarged fragmentary side view of the linkage system and hydraulic ram unit with parts removed showing the implement in a raised position and locked therein.

Fig. 4 is a top view of the structure shown in Fig. 3 with parts removed.

Fig. 5 is an enlarged fragmentary side view of the linkage system when the implement is in a lowered position.

Fig. 6 is a right fragmentary side elevational view of Fig. 1 with parts removed.

As seen in Fig. 1 a plow generally designated by the letter P is illustrative of the type of implement to which my invention is adapted. The plow P is a 3-bottom gang plow of well known construction adaptable to be attached to a tractor, not shown, of any known or suitable type by a drawbar system 10 which is pivotally connected to the plow frame or structure 11 as by a plate 12 and bolts 13. A series of plow beams 14, 15 and 16 arranged as shown forms a part of the frame structure, each beam having a plow bottom 17, 18 and 19 respectively. Frame structure 11 is mounted upon a pair of forwardly located carrying wheels 20 and 21 by bent crank axles 22 and 23 respectively. Rotatably mounted in yokes 24, 25 and 26 and fastened respectively to the plow beams 14, 15 and 16 by shanks 27, 28 and 29 are three coulter discs 30, 31 and 32. A furrow lever assembly generally designated as 33 of well known construction and operation consists of a lever 34 adjustably held by an arcuate toothed rack 35 secured to frame 11. The lever 35 acts through a compound leverage system upon the bent crank axle 23 of the furrow wheel 21 of which more will be said.

To the rear downwardly curved portion of the beam 14 carrying the rearmost plow bottom 17 is rigidly bolted a bracket 36 extending rearwardly parallel with the beam 14. A bent spindle or shaft 37 carried by a caster wheel 38, passes upwardly through and is rotatable in the sleeve bearing 39, sleeve bearing 39 being connected to bracket 36 for rocking movement about a substantially transverse axis by well known construction shown and described in applicant's Patent Number 2,044,718.

This caster wheel mechanism is of well known construction and operation and is operatively associated with the carrying wheels 20 and 21 by a linkage arrangement as best seen in Fig. 2, comprising an arm 40 preferably formed integrally with the bearing 39, the arm 40 being connected to a lever 41, fulcrumed about a stud 42, by a link 43 connecting the upper end of the arm 40 at 44 to the lower end of lever 41 at 45. The lever 41 is pivotally attached at 46 to a forwardly extending rod or link 47 which terminates in a slotted end 48 Fig. 1 associated with the upper end of an arm 49 welded or otherwise secured to the crank axle 22, the rocking of which will operate to raise and lower the caster wheel.

For carrying the previously mentioned hydraulically actuated lifting mechanism there is secured to the forward portion of the plow beam 15 by means of a bolt 50 Fig. 4, or by any similar or suitable means a forwardly extending bracket 54. Bracket 54 is substantially parallel to plow beam 15 and curved upwardly at the free end to form an anchoring or accommodating means for pivotally securing a hydraulic ram or cylinder generally designated as 52 as by a pin 53. It will be noted in Fig. 4 that the anchoring bracket 54 is spaced laterally from the plow beam 15 by a spacer of conventional design 51. A spacer bracket 63 is welded or otherwise suitably secured to the inner surface of the anchoring bracket 54 between the anchoring bracket 54 and plow beam 15. The hydraulic ram or cylinder 52, of any well known type generally associated with farm tractors and implements has a cylindrical body 55 closed at one end by a head 55$^a$ and at the other by a head 55$^b$, a plunger or piston and rod 56 slidable in the cylindrical body, fluid or pressure connections 57 and 57' opening into opposite ends of the cylindrical body and connected to the hydraulic pressure source of the tractor, not shown, and a limit stop control 58.

The spacer bracket 63 as already explained is positioned between the plow beam 15 and the anchoring bracket 54, the undersurface of the spacer bracket 63 lying substantially in the plane of the undersurface of the anchoring bracket 54. Fixed nonrotatably as by welding, or the like to the undersurfaces of the anchoring bracket 54 and the plow beam 15 and extending laterally therefrom substantially perpendicular to the plow beam 15 is a bell crank bearing 62. Rotatably secured in the bell crank bearing 62 as by a washer 62$^a$ and a cotter pin 62$^b$ and extending laterally therefrom is a stud member or pivot 59. The stud 59 extends laterally from the bearing 62 and has secured adjacent its lateral end in the present instance two adjacent trapezoidal-shaped parallel rockable members 60 and 61. The member or plate 60 is secured at its lower forward end to the stud 59 adjacent its lateral end by welding or any other suitable fastening means, the rotation of the stud 59 imparting a like rotative motion to the plate 60. The member or plate 61, in the present instance, is keyed to the stud 59 at its lower forward end as by a conventional key means 61ª, the inner surface of plate 61 contacting the end surface of the bearing 62. The rotation of stud 59 imparts a like rotative force to plate 61, plate 61 remaining at all times parallel and adjacent to plate 60 during such rotative motion. As will be clearly evident, the plates 60 and 61 together form one element of a toggle joint as will be clearly explained presently. It should be further evident that the particular shape of these plates and the number employed is discretionary and variations therein would not take the embodiment outside the principles of this invention. It should also be understood that this manner of securing the plates 60 and 61 so that they are pivotally fixed relative to the main frame is the preferred form taking into consideration structural rigidity and manufacturing costs but is not intended to limit the scope of the present invention.

Pivotally secured to stud 59 between the adjacent parallel plates 60 and 61 is a free rocking link 64. The free rocking link 64 is connectable to a clevis 65 on the piston rod 56 by means of a pin 66 and lock pin or cotter 67. Link 64, as will be more clearly explained, actuates the entire lifting mechanism by rotating the plates 60 and 61 with the stud 59.

Pivotally secured between the rearward ends of the parallel plates 60 and 61 by a pin 68 is a connecting link 69 which is pivotally secured by a pin 70 rearwardly to an arm 71 which arm is welded or fastened in any suitable manner to the above mentioned crank axle 22 of carrying wheel 20, link 69 forming the other element in the aforementioned toggle arrangement.

As shown in Fig. 3, the free rocking link 64 when actuated by the hydraulic ram unit 52 presses against an adjustable thrust block 72 thereby forcing the adjacent plates 60 and 61 and the stud 59 to rotate clockwise as seen in Fig. 3 in the bearing 62. It should be recognized as hereinbefore suggested that the relationship between the adjacent plates 60 and 61 and the connecting link 69 is that of a toggle-joint with the pin 68 acting as the knuckle or knee of the toggle-joint. Therefore when the plow is in a lowered position, the flexion angle 73 is smallest, as seen in Fig. 5, and as the free rocking link 64, actuated by the hydraulic ram 52, forces the adjacent parallel plates 60 and 61 clockwise about the stud 59 by pressing against the adjustable thrust block 72, the flexion angle between the plates 60 and 61 and the connecting link 69 is increased as illustrated in Fig. 3. This straightening of the toggle-joint exerts a rearward thrust against the crank axle 22, which lowers the wheels and consequently raises the plow bottom.

The adjustable thrust block 72 positioned as seen in Fig. 3 between the upper forward portions of the parallel plates 60 and 61 is secured by a bolt 74 insertable in aligned holes 75 and 76 formed in the plates 60 and 61 respectively and a hole 76' formed in the adjustable block 72. Since the free rocking link 64 and the adjacent parallel plates 60 and 61 are pivotal about the same stud 59, the adjustable block 72, once set so that the forward surface of the free rocking link 64 when the link 64 is actuated by the hydraulic ram unit 52 is in contact with it, will continue in intimate contact with the free rocking link 64 as the plates 60 and 61 are rotated with the stud 59.

Block 72 in the present instance is a five sided irregular polygon, the perpendicular distance from the center of the bolt hole 76' of the block 72 to any side of block 72 being different than the distance from the center of the hole 76' to any other side, thereby permitting positioning of the block 72 to compensate for wear in the linkage system. At such times as link 64 is out of contact therewith, block 72 is rotatable about the bolt 74, when said bolt is loosened so as to free the block 72 from the pressure of the plates 60 and 61. By rotating the block 72 about the bolt 74 the user may select any one of the five surfaces to form a stop for the loose pivotal link 64, such selection depending upon the distance from the center of the hole 76' to the side of the block 72 and whether the user wishes to change the limits of the arc of travel of the plates 60 and 61, for a purpose to appear in one direction or the other.

It will be noted in Figs. 3 and 5 that the connecting link 69 extends upwardly and forwardly between the parallel plates 60 and 61 and has a forwardly extending portion 77 provided with a hole 78 formed near its forward end. Aligned holes 79, 80 and 81 and 82 are formed in the rear portion of the parallel plates 60 and 61. Inserted in these aligned holes 79, 80 and 81 and 82 is a spring locking member or hook generally designated as 83.

The spring locking hook 83 shown in Figs. 3 to 5 comprises a stud or pin portion 84 fitted in aligned holes 79 and 80 of the plates 60 and 61, and a portion 85 fitted in aligned holes 81 and 82 of the plates 60 and 61. The inner end of the stud portion 84 is provided with a spring retaining pin 86 and a spring 87, compressed between the pin 86 and the inner surface of the plate 61, thereby keeping the spring locking hook 83 pressed against the outer surface of the plate 60. It will be noted that the lock portion 85 acts as a stop limiting the flexion 73 of the toggle-joint to 180 degrees or less as does also stud portion 84 if portion 85 is withdrawn from hole 78.

When the flexion angle 73 of the toggle-joint is increased by pressure of piston rod 56 through link 64 and block 72 against plates 60 and 61, so that the extended portion 77 of the connecting link 69 presses against the lock portion 85 of the lock hook 83, the locking portion can be moved laterally so that the holes 81 and 82 of plates 60 and 61 will align with hole 78 of the extended portion 77 upon further movement of plates 60 and 61. Portion 85 may then be reinserted in holes 78, 81 and 82 thereby locking the movement of the toggle-joint and the pivotal movement of the plates in the bearing 62. When the toggle-joint of the linkage system is locked, as illustrated in Fig. 3, the plow is fixed in a raised position and the hydraulic ram can be removed. This is done by retracting the ram more or less whereupon pressure is removed from block 72 and link 64 is free to swing about pivot 59 except for its connection with clevis 65. Since all loads except that imposed by the weight of cylinder 52 are removed from link 64 and pin 66, it is a simple matter to remove pins 55 and 66 and also cylinder 52, leaving the plow standing in a stable condition, with link 69 locked to plates 60 and 61 by detent portion 85. When it is desired to lower the plow, the hydraulic ram must be mounted on the plow and extended so as to relieve the pressure on the hook portion 85 by the extended portion 77 of the connecting link 69. It will be noted that when the plow is in a locked position that the hydraulic ram, due to the freely pivotal nature of the free rocking link 64 about the pin 62, can be connected to the free rocking link in an extended, retracted or partially retracted position by merely swinging link 64 until the holes in the link 64 and clevis portion 65 coincide. Pin 66 can then be inserted and locked in place by cotter 67.

As has already been stated the furrow lever assembly is of well known construction and operation. Referring to Fig. 6 it can be seen that, arranged on the above mentioned axle 23 is a bracket or arm 86 having a sleeve portion encircling the axle. The bracket 86 is in the form of a bell crank lever, the free end of which is pivoted as at 87 to a link 88, this link being pivoted at its other end, as at 89 to an ear 90 mounted on the heretofore described lever 34. The lever is pivoted adjacent its lower extremity, as at 91 to a pair of bars 92 and 92', which are pivotally connected adjacent one of their extremities as at 93, to the end of axle 22 of the land wheel 20, which axle, it will be noted, is bent upwardly at 93ª adjacent its extremity, passing through a bearing plate 94, which is secured to the frame by bolts or other suitable means.

The bar 92 is bent upwardly to provide the arcuate toothed rack 35. A rod 95 is secured adjacent and parallel to the lever 34 and carries adjacent its lower end a dog 96 which is urged by means of a spring 97 into engagement with the teeth of the rack 35. Pivotally secured to the bars 92 and 92', as at 98 is a link 99 which is pivotally secured adjacent its other end as at 100 to a bracket 101 which in the present instance is mounted on the bolts 13.

As a result of the connection of the axle 22 of the land wheel 20 with the bar 92 as shown at 93, it will be apparent that adjustment of the land wheel 20 will be transmitted to the furrow wheel 21 through the bars 92 and 92', which will be moved horizontally as a result of the rotation of the crank axle 22, and through the link 88 and bell crank lever 86 the wheel 21 will be adjusted a distance proportional to the adjustment of the land wheel 20, it being understood that the furrow wheel commonly requires only a fraction of the movement imparted to the land wheel.

In the operation of this hydraulic linkage system when the plow is maintained in a raised position by the hydraulic pressure, the extended portion 77 is held against the hook portion 85 which as already described acts as a back stop. When it is desired to lower the plow bottoms, the pressure in the hydraulic cylinder is released from the left of the piston Fig. 3 while the pressure on the right of the piston is increased by pressure from the rearward duct 57' thereby retracting the piston. As the piston retracts the frame 11 is lowered by the force of its own weight and the arm 71 of the crank axle 22 moves forwardly pivoting the connecting link 69 upwardly about the pin 68 and moving the plates 60 and 61 counterclockwise about the bearing 62. This counterclockwise movement of the plates is limited only by the resistance of the hydraulic ram on the free rocking link 64 exerted against the thrust block 72. When the plow bottoms are lowered so that they lie upon the ground, the ground supports the weight of the plow bottoms and the piston of the hydraulic ram can be further retracted as already described thereby moving the free rocking link counterclockwise about stud 59 without a corresponding movement of the plates 60 and 61. This, as already stated, allows the plow bottoms to penetrate the ground by gravity and suction of the shares rather than by the force of the hydraulic ram. When the plow bottoms have penetrated the soil to a sufficient depth, the piston of the hydraulic ram can be moved so that the free rocking link 64 comes in intimate contact with the thrust block 72 thereby stopping the closing of the toggle-joint and setting the linkage system for a plowing depth determined by the position of the ram. When it is desired to raise the plow, the piston of the hydraulic ram is extended by hydraulic pressure through the duct 57 which in turn moves the free rocking link forwardly or clockwise as seen in the several figures about the bearing 62. The free rocking link 64 pushes the plates 61 also clockwise about the bearing 62 through force exerted on the thrust block thereby increasing the flexion angle 73 of the toggle-joint. As the flexion angle 73 of the toggle-joint is increased, the connecting link 69 is moved rearwardly about pin 68 which in turn moves the crank axle 22 rearwardly because of the rearward movement of the arm 71 thereby lowering the wheels or more properly speaking, raising the frame 15 and plow bottom.

It will thus be apparent that an exceedingly convenient means has been provided for raising and lowering a plow frame. Various well-known hydraulic controls are contemplated as adaptable for the construction, some of which give accurate control of the position of the piston within the cylinder 52. With such controls the depth of plowing is readily controlled by merely manipulating the hydraulic system so as to hold the piston in the position necessary to maintain the desired plowing depth.

Other hydraulic systems operate in such a manner as to move the piston to the limit of its travel in one direction or the other. This type of system is equally adaptable, an example being that shown in Fig. 3.

Above mentioned limit stop 59 is slidable on a rod 102 fixed in relation to a head 55ᵇ and may be locked in various positions thereon by means of a pin 103 engaged therewith and with one or another holes 104 in rod 102. Clevis 65, upon movement to the left as seen in Fig. 3, will encounter stop 58 after predetermined movement, the amount of movement being determined by the position selected for stop 58. As will be apparent various positions of stop 58 will result in various positions of rocking link 64 when clevis 65 is against stop 58, and this through plates 60, 61 and link 69, will result in various positions of axles 22 and 23 each corresponding to one of the selected positions of stop 58. Since the plowing depth is dependent upon the position of axles 22 and 23 any selected plowing depth can be reached immediately by simply actuating the hydraulic mechanism to bring clevis 65 against stop 58 in whatever position has been selected for the latter. This type of operation is convenient because the plowing depth will always be the same and no attention need be paid to the plow when lowering it into working position.

Various modifications and improvements within the spirit of my invention will doubtless occur to those skilled in the art from the disclosure herein given, and hence I do not wish to be limited to the particular construction shown or uses mentioned except to the extent that my invention is defined in the appended claims, which are to be interpreted as broadly as is consistent with the state of the art.

I claim:

1. In an implement having a main frame supported on pivotal crank axles, said implement being adapted to be drawn by a propelling agency, in combination, a hydraulic ram unit removably mounted on said implement and operatively connected with said propelling agency, a bearing transversely secured with said frame and extending laterally therefrom, a stud rotatably secured therein, a toggle-joint having a forward element, a rearward element and a knuckle connecting said elements, the forward element of said toggle-joint being fixed adjacent its forward end to said stud, and the rearward element of said toggle-joint being pivotally secured rearwardly with one of said crank axles, said forward elements swingable in one direction to lower one of said crank axles, the flexion angle of said toggle-joint tending to decrease as the weight of said main frame tends to raise said crank axles, a loose pivotal link rotatably secured on said stud adjacent the forward element of said toggle-joint and swingable in the direction of the forward element by action of the hydraulic ram, and an abutment on the forward element of said toggle-joint in the arc of travel of said link as swung in said direction whereby when said loose pivotal link is actuated by said hydraulic ram it presses against said abutment in a direction to rock said forward element thereby maintaining or increasing the flexion angle of said toggle-joint.

2. The invention set forth in claim 1 further characterized by said abutment being an irregular polygon pivotally secured to said forward element of said toggle-joint the distance from said pivotal point to the center of any side of said polygon being different from the distance to any other side thereof so that the distance to the forward surface of said abutment can be changed as desired by rotating the abutment to present a different side to said link.

3. The invention set forth in claim 1 further characterized by said rearward element of said toggle-joint having a portion extended generally forwardly of said knuckle, and means for fixing said forward element of said toggle-joint and said extended portion of said rearward element of said toggle-joint together for maintaining said crank axle in transport position when said hydraulic ram is removed.

4. The invention set forth in claim 1 further characterized by said rearward element of said toggle-joint having a portion extended generally forwardly of said knuckle, and means for limiting the pivotal movement of said extended portion for stopping the movement of said crank axles at transport position when said crank axles are lowered.

5. In an implement having a main frame supported on pivotal crank axles, said implement being adapted to be drawn by a propelling agency, in combination, a hydraulic ram unit removably mounted on said implement and operatively connected with said propelling agency, a bearing transversely secured with said frame and extending laterally therefrom, a stud rotatably secured therein, a toggle-joint having a forward element, a rearward element and a knuckle connecting said elements, the forward element of said toggle-joint being fixed adjacent its forward end to said stud, and the rearward element of said toggle-joint being pivotally secured rearwardly with one of said crank axles, said forward element swingable in one direction to lower one of said crank axles, the flexion angle of said toggle-joint tending to decrease as the weight of said main frame tends to raise said crank axle, said rearward element having a portion extended generally forwardly of said knuckle, a loose pivotal link rotatably secured on said stud adjacent the forward element of said toggle-joint and swingable in the direction of the forward element by action of said hydraulic ram, an irregular polygon pivotally secured on the forward element of said toggle-joint in the arc of travel of said link as swung in said direction, the distance from the pivot point to the center of any other side thereof so that the distance to the forward surface of said thrust block can be changed as desired by rotating the thrust block to present a different side to said link, and means for fixing said extended portion of said rearward element of said toggle and said forward element together for maintaining said crank axles in transport position when said hydraulic ram is removed.

6. In an implement having a main frame supported on pivotal crank axles and adapted to be drawn by a propelling agency, a toggle member having a rockable portion pivoted to said frame and a link pivoted to said rockable portion and to one of said pivotal axles, said link having a portion extending generally forwardly of its pivotal connection with said rockable portion, a hydraulic ram removably pivoted to said frame and in actuating relation to said rockable portion, and means for locking said rockable portion with said extended portion of said link for preventing swinging movement of said rockable portion by actuation by weight of said frame so that said hydraulic ram may be applied to or removed from said implement.

7. In an implement having a main frame supported on pivotal crank axles and adapted to be drawn by a propelling agency, a toggle member having a rockable portion pivoted to said frame and a link pivoted to said rockable portion and to one of said pivotal axles, said link having a portion extending generally forwardly of its pivotal connection with said rockable portion, a hydraulic ram removably pivoted to said frame and in actuating relation to said rockable portion, stop means on said rockable portion in the path of movement of said extended portion of said link for preventing buckling of said toggle member in one direction beyond a predetermined angle, and means for securing said rockable portion to said link for preventing buckling of said toggle member by the weight of said frame so that said hydraulic ram may be applied to or removed from said implement.

8. A plow having a crank axle swingable for raising and lowering said plow, a toggle device comprising a first member pivoted on the plow, and a second member connected for swinging one of said axles for raising said plow upon swinging of said first member in one direction, one of said members having an extension for swinging adjacent the other member upon raising said plow, a link pivotally mounted adjacent said first member, an abutment on said first member in the path of movement of said link, means for rocking the link about its pivot into contact with the abutment and for further rocking said link in contact with the abutment so as to rock the first member of the toggle device in one direction for swinging the axle for raising the plow, and locking means for locking said extended portion to the other of said members when said plow is in a raised position for preventing buckling of said toggle member.

9. A plow having a crank axle swingable for raising and lowering said plow, a toggle device comprising a first member pivoted on the plow, and a second member connected for swinging one of said axles for raising said plow upon swinging of said first member in one direction, one of the members having an extension for swinging adjacent the other member upon raising said plow, a link pivotally mounted adjacent said first member, an abutment on said first member in the path of movement of said link, means for rocking the link about its pivot into contact with the abutment and for further rocking said link in contact with the abutment so as to rock the first member of the toggle device in one direction for swinging the axle for raising the plow, and means carried by said other member and in the path of movement of said extended portion for preventing buckling of said toggle joint beyond a predetermined angle.

10. A plow having a crank axle swingable for lifting and lowering said plow, a toggle device comprising a first member pivoted on the plow and a second member connected for swinging one of said axles for raising said plow upon swinging of said first member in one direction, said second member having an extension for swinging adjacent said first member when said plow is in a raised position, a link pivotally mounted adjacent said first member, an abutment on said first member in the path of movement of said link, means for rocking the link about its pivot into contact with the abutment and for further rocking said link in contact with the abutment so as to rock the first member of the toggle device in one direction for swinging the axle for lifting the plow, and locking means for locking said extended portion of said second member with said first member for locking said plow in a raised position.

11. A plow having a crank axle swingable for lifting and lowering said plow, a toggle device comprising a first member pivoted on the plow and a second member connected for swinging one of said axles for raising said plow upon swinging of said first member in one direction, said second member having an extension for swinging adjacent said first member when said plow is in a raised position, a link pivotally mounted adjacent said first member, an abutment on said first member in the path of movement of said link, means for rocking the link about its pivot into contact with said abutment and for further rocking said link in contact with said abutment so as to rock the first member of the toggle device in one direction for swinging the axle for lifting the plow, and means carried by said first member in the path of movement of said extended portion for preventing buckling of said toggle in one direction upon contact of said extended portion with the last mentioned means for stopping the movement of said crank axle in one direction at transport position.

12. A plow having a crank axle swingable for lifting and lowering said plow, a toggle device comprising a first member pivoted on the plow and a second member connected for swinging one of said axles for raising said plow upon swinging of said first member in one direction, said second member having an extension for swinging adjacent said first member when said plow is in a raised position, said extension and said first member having openings formed therein and positioned to be brought into registry when said plow is in a raised position, a link pivotally mounted adjacent said first member, an abutment on said first member in the path of movement of said link, means for rocking the link about its pivot into contact with the abutment and for further rocking said link in contact with the abutment so as to rock the first member of the toggle device in one direction for swinging the axle for lifting the plow, and locking means insertable in said openings when in registry for locking said extended portion of said second member with said first member for locking said plow in a raised position.

13. A plow having a crank axle swingable for lifting and lowering said plow, a toggle device comprising a first member pivoted on the plow and a second member connected for swinging one of said axles for raising said plow upon swinging of said first member in one direction said second member having an extension for swinging adjacent said first member when said plow is in a raised position, said extension having an opening formed adjacent the end thereof and said first member having a plurality of openings formed therein one of the openings being positioned to be brought into registry with the opening formed in said extension when said plow is in a raised position, a link pivotally mounted adjacent said first member, an abutment on said first member in the path of movement of said link, means for rocking the link about its pivot into contact with the abutment and for further rocking said link in contact with the abutment so as to rock the first member of said toggle device in one direction for swinging the axle for lifting the plow, and locking means slidably supported in the other opening in said first member and having a hook portion insertable in said registered openings for locking said extended portion of said second member with said first member for locking said plow in a raised position.

14. A plow having a crank axle swingable for lifting and lowering said plow, a toggle device comprising a first member pivoted on the plow and a second member connected for swinging one of said axles for raising said plow upon swinging of said first member in one direction, said second member having an extension for swinging adjacent said first member when said plow is in a raised position, said extension having an opening formed adjacent the end thereof and said first member having a plurality of openings formed therein one of the openings being positioned to be brought into registry with the opening formed in said extension when said plow is in a raised position, a link pivotally mounted adjacent said first member, an abutment on said first member in the path of movement of said link, means for rocking the link about its pivot into contact with the abutment and for further rocking said link in contact with the abutment so as to rock the first member of said toggle device in one direction for swinging the axle for lifting the plow, locking means slidably supported in the other opening in said first member and having a hook portion insertable in said registered openings for locking said extended portion of said second member with said first member for locking said plow in a raised position, and resilient means for urging said hook portion into locking engagement.

15. In an implement having a main frame supported on pivotal crank axles and adapted to be driven by a propelling agency, a toggle device having a rockable member pivoted to said frame and a link member pivoted to said rockable member and to one of said pivotal axles, one of said members having a portion extending toward the other member, a hydraulic ram removably pivoted to said frame and in actuating relationship to said rockable member whereby rocking of said rockable member in one direction swings the link member against said axle for raising said plow, said extended portion being swung adjacent the other member when said implement is in a raised position, and means for locking said extended portion to said other member for preventing buckling of said toggle device by the weight of said frame so that said hydraulic ram may be applied to or removed from said implement.

16. In an implement having a main frame supported on pivotal crank axles and adapted to be drawn by a propelling agency, a toggle device having a rockable member pivoted to said frame and a link pivoted to said rockable member and to one of said pivotal axles, said link having a portion extending toward said rockable member, a hydraulic ram removably pivoted to said frame and in actuating relationship to said rockable member whereby rocking of said rockable member in one direction swings said link against said axle for raising said plow, said extending portion of said link being swung adjacent said rockable member when said implement is in a raised position said extending portion and said rockable member having openings formed therein positioned so as to be brought into registry when said implement is in a raised position, and means insertable in said openings for locking said rockable member to said extended portion of said link for preventing buckling of said toggle device by the weight of said frame so that said hydraulic ram may be applied to or removed from said implement.

References Cited in the file of this patent

UNITED STATES PATENTS

| | | | |
|---|---|---|---|
| 2,292,961 | Mott | Aug. 11, | 1942 |
| 2,324,840 | Hipple | July 20, | 1943 |
| 2,410,918 | Acton | Nov. 12, | 1946 |
| 2,458,091 | Moore | Jan. 4, | 1949 |
| 2,481,017 | Johnson | Sept. 6, | 1949 |
| 2,532,577 | Silver et al. | Dec. 5, | 1950 |
| 2,605,686 | Starr | Aug. 5, | 1952 |